E. BODMER.
CLUTCH.
APPLICATION FILED FEB. 26, 1906.
912,358.
Patented Feb. 16, 1909.
2 SHEETS—SHEET 1.
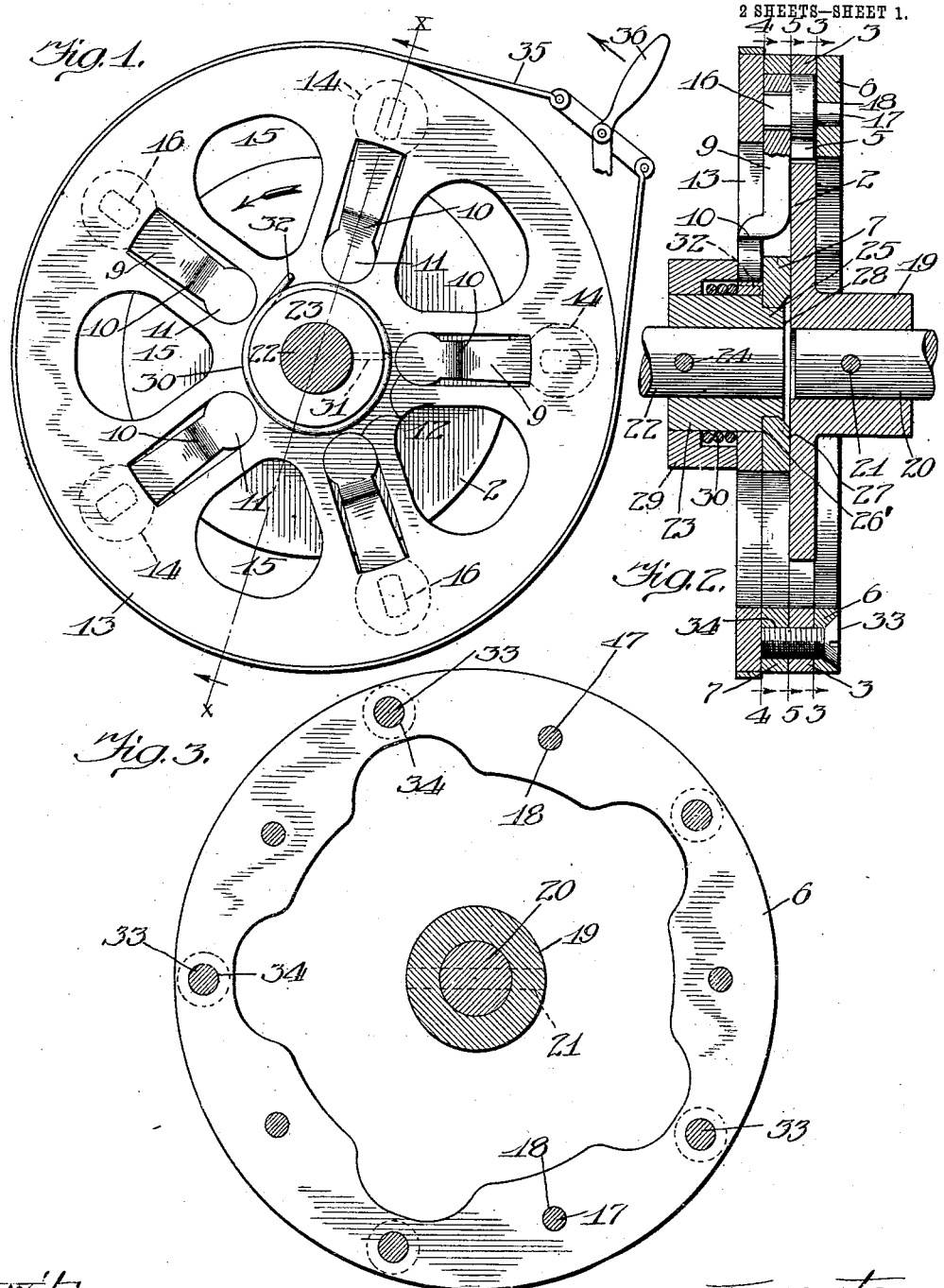
Witnesses:
J. V. Domarus
Robert H. Weir
Inventor:
Eugene Bodmer
By J. Warner Peckstrom
Atty.

E. BODMER.
CLUTCH.
APPLICATION FILED FEB. 26, 1906.
912,358.
Patented Feb. 16, 1909.
2 SHEETS—SHEET 2.
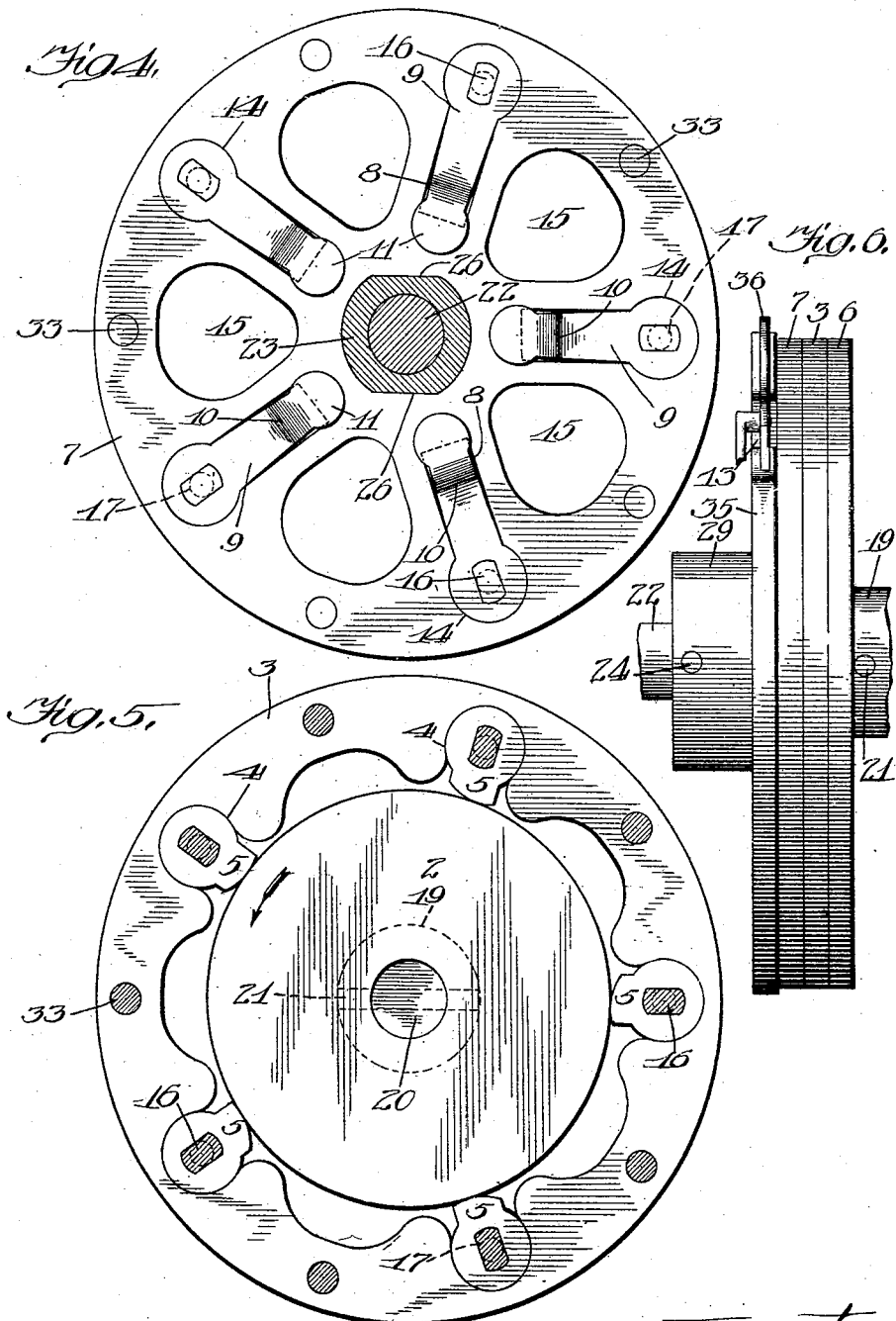
Witnesses:
Inventor:
Eugene Bodmer

UNITED STATES PATENT OFFICE.

EUGENE BODMER, OF CHICAGO, ILLINOIS.

CLUTCH.

No. 912,358.  Specification of Letters Patent.  Patented Feb. 16, 1909.

Application filed February 26, 1906. Serial No. 302,913.

*To all whom it may concern:*

Be it known that I, EUGENE BODMER, a citizen of Switzerland, and a resident of Chicago, in the county of Cook and State of Illinois, have invented certain new and useful Improvements in Clutches, of which the following is a specification.

This invention relates to clutches and its object is to provide a clutch of high efficiency at a low cost, of simple construction and composed of parts which may be made by the comparatively inexpensive punching process; and the invention consists in the novel construction and arrangement of parts hereinafter described in detail, illustrated in the drawings and incorporated in the claims.

In the drawings—Figure 1 is an outside view in side elevation of a clutch embodying my invention, part of the lever and its pivotal support being broken away. Fig. 2 is a transverse section taken substantially on line X—X of Fig. 1. Fig. 3 is a section taken on line 3—3 of Fig. 2. Fig. 4 is a section taken substantially on line 4—4 of Fig. 2. Fig. 5 is a section taken on line 5—5 of Fig. 2. Fig. 6 is an outside edge view.

Referring in detail to the several views, 2 and 3 represent, respectively, the male and female members of the clutch proper, the former being a disk and the latter a ring having recesses 4, 4 adapted to snugly contain segmental disk-portions of the brakes, brake-shoes or cams 5. These cams are held in place in their recesses by a ring-form disk 6, shown best in Fig. 3, on one side and a recessed disk 7 on the other side. The disk 7 is formed with recesses 8 which contain the levers 9 arranged radially. Said levers have outbent portions 10 terminating in segmental disk portions 11 mounted in recesses 12 in the lever-actuating disk 13. The opposite ends of the levers 9 are also of segmental disk forms held in recesses 14 in the disk 7 which are similar to the recesses 4 in the disk or ring 3, and which recesses, as shown, are arranged to interlock the respective cams and levers against any but rotary movements in the planes of the disks with which they are interlocked. The recesses 8 are slightly wider than the straight portions 9 of the levers to permit the latter to have a slight rotary movement. Surplus metal is cut out of the disks 7 and 13 so as to form openings 15 and thereby lighten the clutch of unnecessary weight. The cams 5 and levers 9 have holes therethrough adapted to snugly contain pins 16 which are oblong in cross section, as shown in Figs. 1 and 4. Said pins have studs or journals 17 revolubly mounted in round holes 18 in the ring 6.

The friction-disk or clutch-member 2 is mounted to receive constant rotary motion, and for the purpose of imparting movement to said disk I have shown it provided with a hub 19 mounted on a shaft 20 and securely fastened thereto by means of a pin or key 21 which passes through hub and shaft The shaft 20 is the driving shaft and a concentric shaft 22 abutting the shaft 20 carries the disks 7 and 13 through the medium of a sleeve 23 fastened by a pin 24 to the shaft 22. The disk 7 is apertured to fit the end 25 of the sleeve 23, which end has two flat spots 26 which provide shoulders as at 2' (Fig. 2) against which the disk 7 is supported. The opposite side of the disk 7 is counterbored at 27 and the inner end of the sleeve 23 is upset into the counterbore or countersink as shown at 28. The actuating-disk 13 is held against the disk 7 by means of a cap 29. Within this cap and around the shaft 22 is a coiled spring 30 one end of which is fastened as at 31 to the shaft 22 while the opposite end is fastened at 32 to the disk 13. The spring is normally tensioned so as to swing the levers 9 and therewith the cams 5 and cause the toes of the cams to engage the periphery of the disk 2. The ring 6, clutch-member 3 and disk 7 are held together by means of screws 33 having threaded engagement with openings 34 in the disk 7. This leaves the disk clutch-member 2 free to rotate independently of the other disks when the cams are released, or when the disk 2 is rotated in a direction opposite to the direction of the arrow in Fig. 5.

The actuating disk 13 is provided with a band-brake 35, operated by a lever 36 suitably fulcrumed to some stationary part (not shown). By applying the brake when the disk and clutch as a whole is rotated in the direction of the arrow in Fig. 1, force in opposition to the action of the spring 30 will be exerted to release the cams 5.

My clutch operates as follows: When the shaft 20 is rotated in the direction of the arrow (Fig. 1) and the cams 5 are held in engagement with the disk or clutch-member 2, by virtue of the spring-actuated controlling or actuating disk 13, the motion of the shaft 20 will be communicated to the driven shaft 22 through the disk 7 and sleeve 23, by reason of the cams 5 being mounted on the disk 7 and the ring 6 screwed thereto. If the motion of the controller disk 13 is arrested by means of the band-brake shown or other suitable means the disk 7 will move slightly in advance of the controller disk and thereby swing the levers 9 to release the cams 5 thus bringing all of the parts to a stop except the shaft 20, hub 19 and disk 2. By simply releasing the brake, or restraint upon the disk 13 the spring 30 will rotate it forward and automatically cause the engagement of the cams. By judicious manipulation of the controller disk 13 the cam engagement may be made gradual, when desired, so as to permit the cams to take a sliding hold at first and thus start the driven shaft 22 gradually. This might also be accomplished by a gradual release of the band-brake to counteract the full force of the spring 30.

It is obvious that numerous modifications in the embodiment of the principles of my clutch may be made without departing from the spirit of the invention. The levers 9 and cams 5 might consist of a single member, for instance, and the forms of the elements 2 and 3 are particularly susceptible of numerous changes. The embodiment which I have illustrated is made up of parts which can be made by an inexpensive process of manufacture, and which are easily assembled or replaced. The cam-grips, unlike ordinary friction contacts, is absolute and is enhanced by the resistance. The arrangement of levers and cams, as well as their control, also admits considerable variety in the force of engagement, there being room for twice as many cams and levers as shown and a less number may be used according to the requirements in each special instance. Considering the parts 9, 16, 5 and 17 as a single piece, or a single element, the latter may, together with its coöperating element 2, assume a large variety of forms, though, probably, more expensive to make.

I claim—

1. The combination with a driving shaft and a driven shaft, of a rotary friction-member and a brake-member normally rotatable together, the former being keyed to said driving shaft, a series of coöperating friction-members arranged to move with said driven shaft and to normally engage said rotary friction member, and means for releasing said coöperating friction members simultaneously through said brake-member.

2. In a clutch, the combination, with a shaft, of a friction-disk, a series of cams arranged to engage the periphery of said friction-disk, a series of levers fulcrumed on the axes of said cams, and a controlling disk in which the power ends of said levers are mounted, said last-mentioned disk mounted concentrically with said shaft and rotatable relatively thereto, whereby movement may be imparted to said levers to move said cams into and out of engagement with said periphery.

In testimony whereof I have hereunto set my hand in the presence of two subscribing witnesses.

EUGENE BODMER.

Witnesses:
FRED. L. KOEHLER,
J. W. BECKSTROM.